Patented Dec. 20, 1949

2,491,927

UNITED STATES PATENT OFFICE 2,491,927

BIOCHEMICAL PROCESS FOR PRODUCTION OF VITAMINS OF THE B COMPLEX

Jerome Martin, Terre Haute, Ind., assignor to Commercial Solvents Corporation, Terre Haute, Ind., a corporation of Maryland No Drawing. Application December 6, 1944, Serial No. 566,957

1 Claim. (Cl. 195—37)

My invention relates to the production of vitamins of the B complex. More particularly, it is concerned with the synthesis of riboflavin and other related vitamins, such as pantothenic acid, by the action of the fungus *Eremothecium Ashbyii* on certain solid substrates.

It has previously been known that the organism *Eremothecium Ashbyii* is capable of synthesizing riboflavin in limited quantities from gelatinous media of the nature of agar preparations and the like containing carbohydrate and protein. These media contained glucose as the carbohydrate source and peptone and beef bullion as the protein source. The yields of riboflavin thus produced, however, were relatively small and in general it required approximately three weeks or more to secure such yields. With liquid media, utilizing the peptone-glucose type nutrients referred to above, the yields of riboflavin were inferior to those obtained where the gelatinous or so-called semi-solid media were utilized. More recently a process for producing such vitamins has been discovered which involves subjecting mashes consisting essentially of protein and carbohydrate to the fermenting action of an active culture of *Eremothecium Ashbyii* while aerating the mash throughout the fermentation period. This procedure is described in detail in copending application, U. S. Serial No. 434,901, filed March 16, 1942, by H. R. Stiles, Patent No. 2,483,855. Such a process is readily adaptable to commercial production of riboflavin and pantothenic acid by fermenting large volumes of liquid media.

The aerated liquid process, however, while producing improved yields over the older methods, requires large quantities of air for aeration thereof, usually involving the necessity for a high pressure air system. Furthermore, for certain purposes, for example in cases where the riboflavin material is to be used as a supplement for animal feeds and is to be blended therewith, the use of the liquid fermentation process presents the difficulties and expense of evaporation, drying and uniform blending with the particular feed materials and nutrients.

It is therefore an object of my invention to provide a process for preparing a riboflavin material which requires a minimum of air to supply the necessary aerobic conditions for the adequate growth and riboflavin etc. production of the organism.

A further object of my invention is to prepare a material high in B-complex vitamins including riboflavin, in a form particularly suitable for blending with animal feed material.

Other objects will appear hereinafter.

These and other objects are accomplished by my invention which involves a method for synthesizing riboflavin in which the aforesaid fungus is grown in the presence of a sterile oxygen containing gas such as air, on a suitable solid base or carrier, with the addition of a nutrient solution.

The solid base or carrier may itself furnish a major portion of the nutrient necessary for the growth and vitamin production of the organism. The necessary nutrients may be added in an appropriate form such as by a liquid nutrient solution used to moisten and thinly coat the carrier particles.

The process of my invention requires the selection of a suitable base or support for the organism. The nutrient solution is added to the base in a sufficient quantity to support the normal growth of said fungus, the base and nutrient solution being thoroughly mixed to insure a complete and uniform distribution of the nutrient solution upon the base. The mixture thus produced is then sterilized. The sterilization may require a somewhat longer period than that required for liquid media, as the heat transfer properties of the carrier materials tend to be poor. Usually, however, a period of from three to five hours at a steam pressure of 15 to 20 pounds is sufficient for batches of up to about 10 gallons, although longer periods may be required for larger batches. When the sterilization step has been completed, the mass is cooled to a temperature of between about 25 and 30° C. and then inoculated with an active culture of *Eremothecium Ashbyii*, after which it is allowed to ferment in the presence of a sterile oxygen containing atmosphere such as air. During the fermentation, the medium is agitated either continuously or intermittently in order that the mold spores may be uniformly dispersed. When the fermentation is finished, the substantially dry mass may, if desired, be used as such to supplement stock feeds of various types which are deficient with respect to their riboflavin and pantothenic acid contents. If desired, however, the substantially pure riboflavin can be obtained by extracting the solid fermented mass, for example, with hot water or with a suitable dilute acid such as dilute acetic acid. The riboflavin present in the extract may then be recovered therefrom in accordance with any of several known methods, for example, by adsorption on a suitable adsorbent material such as fuller's earth or adsorbent clay. The resulting adsorbate can then be treated in known manner with a suitable elution solvent, as for example, that described in U. S. Patent No. 2,343,254 of Dale or U. S. Patent No. 2,006,699 of Supplee, to obtain the riboflavin in a substantially pure state.

The nutrient solution may in general be any liquid medium which has previously been known to support the growth of the fungus *Eremothecium Ashbyii*. Ordinarily I prefer, however, to use as a nutrient, a solution comprising essentially a sugar such as glucose dissolved in yeast water or the aqueous residues obtained from a yeast fermentation sometimes called "thin grain slop" and containing dissolved glucose. Typical yeast fermentation residues which may be utilized are those resulting from corn, corn-rye, corn-wheat, or similar mashes. While the concentration of dissolved glucose may vary, I have found that nutrient solutions containing from between about 0.5 to 1.0% of a sugar such as glucose are quite satisfactory. Solutions having a lower sugar concentration than 0.5% are generally less desirable since larger volumes may be necessary to furnish the required proportion of glucose and thus frequently result in converting the solid medium on which the mold is grown into a sticky or sloppy intractable mass. Ordinarily nutrient solutions containing from about 0.5 to about 1.0% sugar when added in amounts corresponding to about 300–350 parts by weight of solution for each 325–350 parts by weight of support or carrier employed will produce a high yield of riboflavin. The addition of the nutrient solution can be adjusted to contain only the quantity and kind of nutrients required to supplement the nutrient values existing in the carrier. It should be pointed out that since the aqueous yeast fermentation residues described above, have a comparatively low pH, it is usually desirable to adjust the acidity thereof to a value of around 6.0 to 6.5. This can readily be accomplished by the addition of dilute alkali to said residue prior to mixing with the carrier. In further regard to the expression "nutrient solution," as used throughout the present disclosure and appended claim, it is to be strictly understood that such terminology is intended to cover any nutrient solution that has been previously known to support the growth of the fungus *Eremothecium Ashbyii* and in particular, the solutions obtained by dissolving a sugar such as glucose, preferably in the amounts indicated above, in yeast water or aqueous residues from any yeast fermentation, or if desired, the sugar may be replaced in part by a metabolizable lipid as described in copending application, Serial No. 465,383, filed November 12, 1942, Patent No. 2,374,503.

The carrier or support used in the process of my invention may be in fluffy, granular, shredded, flake or similar form. It must have a relatively large surface area per unit weight, it should not coalesce to become sticky or gummy throughout the fermentation period, it must remain porous and light during processing and no substances should be present or formed which specifically inhibit the fermentation or riboflavin production. Carriers found to be particularly suitable are those selected from the class consisting of oat hulls, corn bran, wheat bran and bone meal. These carriers contribute to the nutrient requirements of the fermenting organism.

For optimum results, the container in which fermentation is to be carried out should be filled in such a way with the carrier as to permit of such ready mixing and air distribution as to satisfactorily supply the required aerobic conditions for growth and vitamin production of the organism. Using a rotating drum of the type described in the examples included hereinafter, I have found that the proportion of carrier should not exceed about three-fourths of the total volume of said container. Otherwise, it becomes difficult to disperse the air adequately throughout the mass.

The fermentation may be effected at temperatures varying from about 20 to 35° C. However, it has been found preferable to employ temperatures of between approximately 25 and 30° C. Temperatures within the latter range appeared to bring about a favorable growth of the mold, resulting in a relatively short period of the order of several days for completion of the fermentation.

The container employed in carrying out the process of my invention may be of any suitable design. For the majority of purposes I prefer, however, to utilize a closed fermentation vessel containing a sterile oxygen containing gas such as air and adapted to be rotated continuously or intermittently during the fermentation. In a vessel of this type, the carrier to which the nutrient solution has been added and mold culture grown thereon are effectively aerated in an atmosphere of sterile air, or the like, by merely revolving the vessel in a manner such that the carrier travels part way up the sides of the vessel and then falls back to the bottom thereof. A variation of the above, by which effective aeration of the medium is obtained, embodies the use of a vessel equipped with entrance and exit ports for sterile oxygen containing gas such as air as well as a suitable sparger i. e. a perforated air inlet member to insure a substantially uniform distribution of the air through the solid medium. The exit port of such vessel should be sealed from the atmosphere to avoid contamination. This object can readily be accomplished for example, by the use of a suitable liquid seal or by inserting a sterile cotton plug in the exit port. With vessels of the latter type sterile air may be introduced at a rate of from between about 0.045 cubic foot to about 9.5 cubic feet of air per hour per cubic foot of solid medium. As far as I have been able to determine, the introduction of air in amounts which are in excess of the aforesaid range result in only a negligible increase in the yield of riboflavin.

My invention may be more specifically illustrated by the data appearing in the tables below.

In Table I is shown the riboflavin production from nutrient solutions on various carriers when a partially filled container was agitated by rotation and aerated by diffusion through porous sterile plugs used as closures for the containers. In this series of tests, the nutrient medium was made up by adding 0.5% dextrose to an aqueous residue from the yeast fermentation of wheat and wheat flour mash. The pH was adjusted to 6.1 with 10% NaOH solution and the mixture was used in the quantities indicated in the table to moisten the indicated quantity of carrier. The media were placed in the rotating containers and autoclaved for three hours at 15 pounds steam pressure. Each container was inoculated with 30 parts of a 48 hour old second generation flask culture of *Eremothecium Ashbyii*. The containers were rotated, continuously or intermittently as indicated in the table, at a rate of 1.3 R.P.M. The bran was thereby carried partway up the side of the container and fell back to the lower side again at each revolution, serving to thoroughly mix and aerate the culture. After the indicated number of days, the culture medium was removed from the container, dried at 37° C. When dry an extract was made by steaming 5 grams of the medium in 500 ml. of 0.1 N acetic acid for thirty minutes. The extract was filtered and assayed for riboflavin with a photofluorometer.

It will be observed that corn bran and wheat bran, to which only water and sugar had been added gave excellent yields of riboflavin, the carrier apparently furnishing much of the required nutrient.

which under the conditions of use will not become sticky or glue-like but preferably remains porous and light during processing, and which contains no inhibitory substances. The yields of riboflavin may vary widely depending upon the closeness with which the particular carrier used meets these desired characteristics. Some rather closely related carrier materials are decidedly less suitable than the preferred materials disclosed in Tables I and II and give substantially lower yields than disclosed therein.

TABLE I

*Riboflavin production on solid base—Rotated container*

| Carrier | | Nutrients added | | Temperature, °C. | Time, Days | Riboflavin, μg. per gram, air dry Culture Medium | Remarks |
|---|---|---|---|---|---|---|---|
| Kind | Parts | Dextrose | Other | | | | |
| Wheat Bran | 325 | 1.48 | TGS [1]—275 parts | 24 | 5 | 1,800 | Continuous rotation. |
| Do | 325 | 1.48 | TGS—275 parts | 24 | 7 | 2,500 | Do. |
| Do | 325 | 1.5 | TGS—300 parts | 24 | 9 | 2,300 | Intermittent rotation four hours per day. |
| Do | 325 | 1.5 | TGS—300 parts | 24 | 9 | 3,300 | Do. |
| Oat Hulls | 60 | .6 | TGS—120 parts | 24 | 7 | 1,640 | Do. |
| Wheat Bran | 162 | 1.5 | Water—300 parts | 24 | 7 | 2,800 | Do. |
| Corn Bran | 150 | .85 | Water—170 parts | 24 | 7 | 1,300 | Do. |
| Do | 150 | .85 | TGS—170 parts | 24 | 7 | 1,500 | Do. |
| Bone Meal | 320 | .650 | TGS—130 parts | 24 | 10 | 2,200–2,900 | Do. |

[1] Yeast fermentation residue, e. g. thin grain slop.

In Table II is shown riboflavin production of positively aerated cultures. In this series of tests a container was used which had an inlet for compressed air in the top and small holes in the bottom for air outlet. Over the bottom of the can was placed a cotton pad and a paper cap. The carrier-nutrient compositions were placed in the container so as to occupy about three-fourths of the available space, and the container and contents were autoclaved for three hours. The sterilized medium was then inoculated with forty parts of a forty-eight hour old second generation flask of *Eremothecium Ashbyii*, and then sterilized, humidified air was passed through the culture at rates varying from 0.005 cubic foot per hour to 0.9 cubic foot per hour. The culture was agitated vigorously immediately after inoculation, and again each day to thoroughly distribute the spores through the medium.

After the indicated number of days, the media were removed, extracted and assayed for riboflavin.

The various experimental conditions such as temperature, aeration rates, and methods of bringing the mold into contact with sterile oxygen containing gas may be subjected to numerous modifications without departing from the scope of my invention. If culture media other than those of the type specifically mentioned are utilized, those skilled in the art may readily make the necessary adjustments to obtain the experimental conditions indicated above.

My invention now having been described, what I claim is:

In the biochemical synthesis of riboflavin, the process which comprises impregnating a porous solid material in particulate form, selected from a class consisting of oat hulls, corn bran, wheat bran and bone meal, with an aqueous nutrient medium, having a sugar concentration of about 0.5–1.0% by weight, in quantity sufficient to moisten said carrier material and to form a liquid film over the surface of the particles thereof, sterilizing the mass, inoculating with an active

TABLE II

*Riboflavin production on solid base—Stationary aerated container*

| Carrier | | Nutrients added | | Temperature, °C. | Time, Days | Riboflavin, μg. per gram, air dry Culture Medium | Remarks |
|---|---|---|---|---|---|---|---|
| Kind | Parts | Dextrose | Other | | | | |
| Wheat Bran | 325 | Parts 1.4 | TGS [1]—275 parts | 24 | 7 | 3,000–4,000 | Continuous high air rate. 0.9 cu. ft./hr. |
| Do | 325 | 1.4 | TGS—275 parts | 24 | 6 | 3,200 | Do. |
| Do | 325 | 1.4 | TGS—275 parts | 30 | 4 | 2,600 | Do. |
| Do | 325 | 1.5 | TGS—300 parts | 24 | 6 | 1,700 | Do. |
| Do | 325 | 1.5 | TGS—300 parts | 24 | 6 | 3,300 | Intermittent Low Air rate 0.005 cu. ft./hr. |

[1] Yeast fermentation residue, e. g. thin grain slop.

It is to be understood, of course, that the above examples are merely illustrative and are to be in no way considered limitative. These examples show that the carrier selected must be one that has a large surface area per unit weight and culture of *Eremothecium Ashbyii*, maintaining the temperature of the inoculated mass within the range of about 20–35° C. and the pH within the range of about 6.0–6.5, supplying sterile air to aerate the mass at the rate of from about 0.005-9.5 cubic feet per hour per cubic feet of solid medium and agitating the mass to distribute the air uniformly therethrough.

JEROME MARTIN.

REFERENCES CITED

The following references are of record in the file of this patent:

UNITED STATES PATENTS

| Number | Name | Date |
|---|---|---|
| 1,680,926 | Wooyenaka | Aug. 14, 1928 |
| 2,006,086 | May | June 25, 1935 |
| 2,291,009 | Underkofler | July 28, 1942 |
| 2,374,503 | Rudert | Apr. 24, 1945 |

FOREIGN PATENTS

| Number | Country | Date |
|---|---|---|
| 17,374 | Great Britain | of 1891 |

OTHER REFERENCES

Industrial and Engineering Chemistry, "Reports on the chemical world today," December 1943, page 5.

Raffy et al.: Comptes Rendus, Tome 205 (1937), pages 1005–1006.

Raffy et al.: Comptes Rendus, Soc. de. Biologie (1937), pages 875–877.

Guilliermond: Comptes Rendus, T. 200 (1935), pages 1556 to 1558.

Schopfer: Helvetica Chimica Acta, V. XXVII, pages 1017–1032.